United States Patent [19]

Okabe

[11] Patent Number: 4,699,005

[45] Date of Patent: Oct. 13, 1987

[54] APPARATUS FOR MEASURING ANGULAR VELOCITY

[75] Inventor: Takahiro Okabe, Nagoya, Japan

[73] Assignee: Nippondenso Co., Ltd., Kariya, Japan

[21] Appl. No.: 884,298

[22] Filed: Jul. 10, 1986

Related U.S. Application Data

[63] Continuation of Ser. No. 554,389, Nov. 22, 1983, abandoned.

[30] Foreign Application Priority Data

Nov. 23, 1982 [JP] Japan .............................. 57-205146
Nov. 23, 1982 [JP] Japan .............................. 57-205147
Nov. 23, 1982 [JP] Japan .............................. 57-205148
Nov. 4, 1983 [JP] Japan .............................. 58-208020

[51] Int. Cl.$^4$ .............................................. G01P 9/00
[52] U.S. Cl. ..................................... 73/505; 324/160
[58] Field of Search ............... 73/505, 517 A, 517 R; 324/160, 58 R, 58.5 R; 356/350

[56] References Cited

U.S. PATENT DOCUMENTS

| | | | |
|---|---|---|---|
| 3,395,270 | 7/1968 | Speller | 73/505 |
| 3,861,220 | 1/1975 | Felsenthal | 73/517 A |
| 4,384,409 | 5/1983 | Lao | 33/318 |
| 4,429,573 | 2/1984 | Walker | 73/517 R |

OTHER PUBLICATIONS

Frost: "Rotation Sensing Through EM-Saw Transduction", Journal of App. Physics-vol. 48-Jan. 77-pp, 52-58.

Primary Examiner—John Chapman
Attorney, Agent, or Firm—Cushman, Darby & Cushman

[57] ABSTRACT

An apparatus for measuring angular velocity is provided with a microwave oscillator, closed-loop waveguide and a microwave-detector. The microwave oscillator generates microwaves and the waveguide which may employ a magic tee as a part thereof separates the microwaves to propagate one and the other of separated microwaves clockwise and counterclockwise therethrough, respectively. The microwave detector mixes and microwave-detects one and the other of the separated microwaves propagated through said waveguide. When the waveguide is in rotary motion, frequencies or phases between the separated microwaves differ from each other in dependence upon the angular velocity and the microwave detector produces an output signal corresponding to the difference in frequencies or in phases between the separated microwaves. The angular velocity of the waveguide is measured by the use of output alternating signal component corresponding to the frequency difference between the separated microwaves or by the use of output direct current signal component corresponding to the phase difference between the separated microwaves.

11 Claims, 16 Drawing Figures (a)

(b)

APPARATUS FOR MEASURING ANGULAR VELOCITY

This is a continuation of application Ser. No. 554,389, filed Nov. 22, 1983, which was abandoned upon the filing hereof.

BACKGROUND OF THE INVENTION

The present invention relates to apparatus for measuring the angular velocity of a rotating body, more particularly to apparatus which uses a difference in frequencies or phases between microwaves propagated clockwise and counterclockwise through a closed-loop microwave propagation path.

For the measurement of the angular velocity of a rotating body, a mechanical gyro which uses a spinning rotor to cause inclination of its axis in accordance with the angular velocity of the rotating body is known. Known also is a laser gyro which uses laser lights propagated clockwise and counterclockwise through a predetermined optical path for optical interference with each other to provide optical interference stripes indicative of the phase difference corresponding to the angular velocity of the rotating body.

The former gyro, however, needs a power generator such as an electric motor which enables the rotor to spin at a high speed and hence it becomes undesirably large in size.

The latter gyro, although not so large in size, needs a very complicated electronic circuit which converts the optical interference stripes indicative of the phase difference caused by the interference between the clockwise and counterclockwise laser lights into electric signals.

SUMMARY OF THE INVENTION

It is, therefore, a primary object of the invention to provide an angular velocity measuring apparatus which is compact in size and does not require any complicated electronic circuit.

It is a further object of the invention to provide an angular velocity measuring apparatus which propagates microwaves clockwise and counterclockwise by a predetermined length through a closed-loop microwave propagation path and detects a difference in frequencies or in phase between the clockwise and counterclockwise microwaves for measuring the angular velocity.

It is a still further object of the invention to provide an angular velocity measuring apparatus of the above-described type in which larger difference in frequencies or in phase is provided to enable more accurate measurement.

DETAILED DESCRIPTION OF THE PREFERRED EMBODIMENTS

Figure 1:
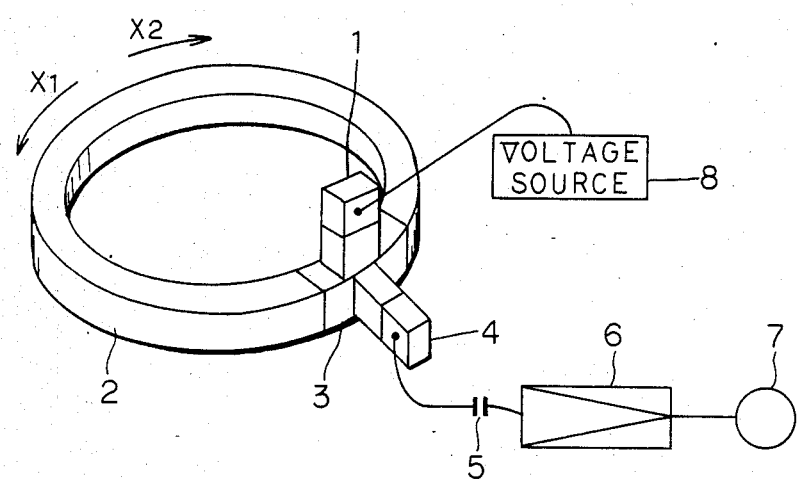
FIG. 1 is a schematic perspective view illustrating the angular velocity measuring apparatus according to the first embodiment of the invention.

The present invention will now be described with reference to the accompanying drawings in which same structual parts are designated by the same reference numerals.

In the embodiments to follow, it is assumed that when the Q-factor of a microwave oscillator is determined to be smaller than that of a waveguide only frequency differences exist in microwaves which propagate clockwise and counterclockwise. When the Q-factor of the oscillator is determined to be larger than that of the waveguide only phase differences exist in the same.

Referring first to FIG. 1 which illustrates the first embodiment of the invention, a microwave oscillator 1 which may employ a Gunn diode or Impatt diode incorporated within a resonance circuit or Klystron, Magnetron or the like is used for generating microwaves. The microwave oscillator 1 is securely connected with a magic tee 3, more particularly with the input port thereof, which receives the microwaves from the microwave oscillator 1 and separates the same equally into two opposed propagation directions. The magic tee 3, more particularly the intermediate portion thereof, is securely connected with a waveguide 2 so that the microwaves separated by the magic tee 3 may propagate clockwise and counterclockwise through the hollow propagation path of the waveguide 2. The waveguide 2 and the magic tee 3 provide a circularly closed microwave propagation path.

Figure 2:
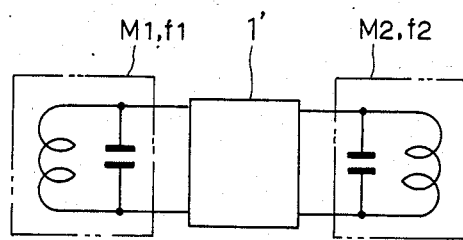
FIG. 2 is a diagram illustrating an electric circuit equivalent to the combination of microwave oscillator, magic tee and waveguide shown in FIG. 1.

It should be understood that the frequency f of the microwaves which oscillate in and propagate through the waveguide 2 is dependent on the length L of the microwave propagation path since the oscillation condition is defined as $m \cdot \lambda g = L$ with m and $\lambda g$ being an integer number and the waveguide wavelength respectively. Thus the frequency becomes lower as the propagation path becomes longer. Since the microwaves propagate clockwise and counterclockwise through the waveguide 2, there exists two microwave propagation paths, i.e., clockwise and counterclockwise paths. Thus, the combination of microwave oscillator 1, waveguide 2 and magic tee 3 can be represented electrically by the equivalent circuit shown in FIG. 2, wherein the resonance circuit 1' of the microwave oscillator 1 is connected to two resonance circuits M1 and M2 having respective resonance frequencies $f_1 = V_p \cdot m / L1$ and $f_2 = V_p \cdot m / L2$ and corresponding to respective clockwise and counterclockwise propagation paths.

Referring to FIG. 1 again, the magic tee 3, more particularly the output port thereof, is securely connected further with a microwave detector 4 which employs a microwave-detecting diode. The microwave detector 4 subjects the microwaves which propagated through the waveguide 2 and are turned at the output port of the magic tee 3 to mixing or superposition and microwave-detection so that an output signal indicative of difference in frequencies between the two microwaves is produced.

A capacitor 5 is connected to the microwave detector 4 for cutting off direct current signal component from the output signal produced by the microwave detector 4. The capacitor 5 is connected to a low frequency amplifier 6 which amplifies the alternating current signal component of the output signal produced by the microwave detector 4 and passed through the capacitor 5. The capacitor 5 may not be used if the amplifier 6 is designed not to saturate. The amplifier 6 is in turn connected to an indicator device 7 which comprises a frequency-voltage converter and a voltmeter. A stabilized voltage source 8 which supplies a predetermined stabilized voltage of several volts is connected to the microwave oscillator 1 so that the microwave oscillator 1 generates the microwaves with the stabilized voltage.

In operation, the microwave oscillator 1 supplied with the stabilized voltage from the voltage source 8 generates microwaves and the magic tee 3 separates the same equally into two opposing directions so that one and the other of the separated microwaves propagate clockwise and counterclockwise through the waveguide 2.

When the microwave system comprising the microwave oscillator 1, waveguide 2, magic tee 3 and microwave detector 4 is in a stationary condition, i.e., in no motion, the lengths of the clockwise and counterclockwise propagation path in the waveguide 2 are equal to each other. Thus, the frequencies $f_1$ and $f_2$ of the microwaves propagating clockwise and counterclockwise are equal to each other and phases of the microwave are also equal to each other.

When the microwaves complete one clockwise and counterclockwise propagations and arrive at the magic tee 3 in the same phase, the microwaves are turned toward the output port of the magic tee 3 so that the microwaves have opposite phases to each other. The microwave detector 4, performing mixing and wave-detecting, produces no output signal because of no difference in frequencies and opposite phases to each other. The indicator device 7 receiving no output signal through the capacitor 5 and low frequency amplifier 6, as a result, indicates no difference in frequencies, or no angular velocity of the microwave system.

On the other hand, when the microwave system is in a rotary motion in a direction X1 or X2 about the central axis of the waveguide 2 or some other axes, the actual lengths of the clockwise and counterclockwise propagation paths differ from each other. For instance, the actual lengths of the clockwise and counterclockwise propagation paths become shorter and longer than that in no motion, respectively, when the microwave system rotates in the counterclockwise direction X1, and vice versa. With the rotary motion of the microwave system in the direction X1, the frequencies $f_1$ and $f_2$ of the microwaves propagating clockwise and counterclockwise become higher and lower than that in no motion, respectively, thus resulting in the frequency difference $\Delta f$.

Assuming that the microwave system is in the rotary motion about the central axis of the waveguide 2, the frequency difference $\Delta f$ is expressed as follows.

$$\Delta f = 2 \cdot f \cdot r \cdot w / V_p$$

Here, symbols f, r, w, and $V_p$ represent, respectively, frequency ($f_1 = f_2$) of the microwave generated by the microwave oscillator 1 when the microwave system is in no motion, radius of the waveguide 2, angular velocity of the microwave system and phase velocity of the microwaves propagating through the waveguide 2. It should be understood from the foregoing that the frequency difference $\Delta f$ is in proportion to the angular velocity w of the microwave system.

When the microwaves complete one clockwise and counter clockwise propagations and arrive at the magic tee 3, the microwaves are turned by the magic tee 3 and transmitted to the microwave detector 4 through the output port of the magic tee 3 to be mixed and microwave-detected. The microwave detector 4, performing mixing and microwave-detecting operation, produces an output signal having alternating and direct current signal components. The alternating current signal component has a frequency equal to the frequency difference $\Delta f$ between the two frequencies $f_1$ and $f_2$. The direct current signal component is cut off by the capacitor 5 and only the alternating current signal component is amplified by the low frequency amplifier 6 so that the indicator device 7 indicates the frequency difference, or the angular velocity of the microwave system.

According to one experiment conducted by the inventor with respect to the above-described first embodiment in which the waveguide 2 having a radius r of $\frac{1}{2}\pi$ meters was used, the microwave oscillator 1 which generates microwaves having a frequency f of $24 \times 10^9$ hertz under no motion of the microwave system was used and the microwave system was rotated about the central axis of the waveguide 2 at the angular velocity w of $\pi/2$ per second, the indicator device 7 indicated a value indicating to the frequency difference $\Delta f$ of 32 hertz. It should be noted that, if the phase velocity $V_p$ of the microwaves propagating through the waveguide 2 which is approximately $3.75 \times 10^8$ meters per second into consideration, the result of the experiment agrees with the above-described expression, $$\Delta f = 2 \cdot f \cdot r \cdot w / Vp.$$

According to the other experiment in which only the angular velocity w is changed to 4.5 degrees per second, the indicator device 7 indicated a value corresponding to the frequency difference Δf of 1.6 hertz.

Figure 3:
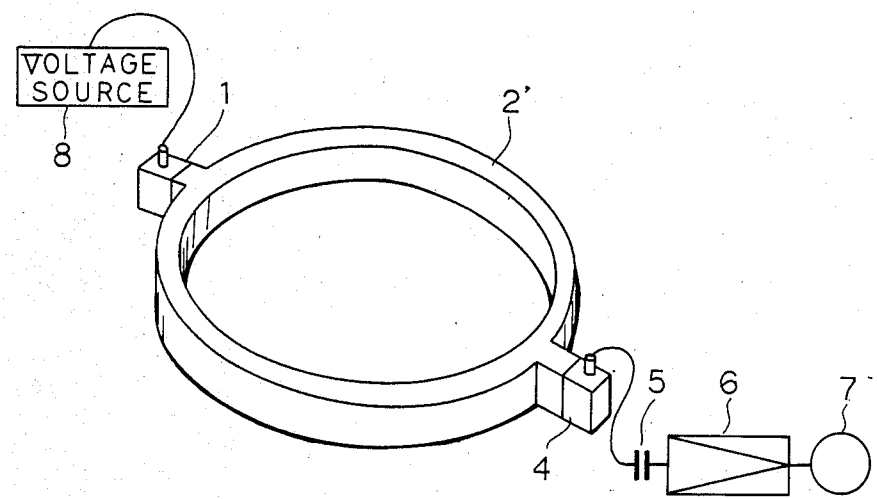
FIG. 3 is a schematic perspective view illustrating the angular velocity measuring apparatus according to the second embodiment of the invention.

The first embodiment of FIG. 1 may be modified as shown in FIG. 3 which illustrates the second embodiment of the invention. In this embodiment, no magic tee is used. Instead, the microwave oscillator 1 and the microwave detector 4 are securely connected to the input port and the output port of a circularly closed waveguide 2', respectively, which is designed to separate the microwaves generated by the microwave oscillator 1 into a clockwise and counterclockwise propagation paths equally at the input port and to turn the microwaves toward the microwave detector 4 at the output port after the completion of predetermined propagation of the microwaves through the waveguide 2'. Although not limited, the input port connected with the microwave oscillator 1 and the output port connected with the microwave detector 4 are preferably positioned diagonally to each other so that the lengths of the clockwise and counterclockwise microwave propagation paths in the waveguide 2' are equal to each other when the microwave system is in no rotary motion.

The operation of the second embodiment is substantially the same as in the first embodiment except that the microwaves separated into the clockwise and counterclockwise directions propagate only one half of the whole circumferential propagation path of the microwave 2' because of the diagonal relationship between the microwave oscillator 1 and the microwave detector 4. Since the length of the microwave propagation path through the waveguide 2' is one half as compared with the first embodiment, the frequency difference Δf is doubled. With the frequency difference doubled thus, more accurate measurement of the angular velocity is enabled.

Figure 4:
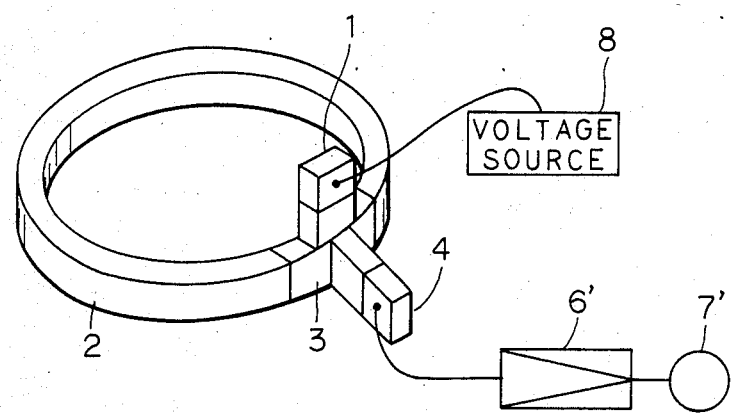
FIG. 4 is a schematic perspective view illustrating the angular velocity measuring apparatus according to the third embodiment of the invention.

Referring next to FIG. 4 which illustrates the third embodiment of the invention, the microwave detector 4 is directly connected with a direct current amplifier 6' which is in turn connected with an indicator device 7' which may be a voltmeter or ampere meter.

In operation, the microwaves generated by the microwave oscillator 1 and separated by the magic tee 3 equally propagates clockwise and counterclockwise through the waveguide 2 and then are transmitted to the microwave detector 4 in the same manner as in the first embodiment shown in FIG. 1. Therefore, the wave detector 4 produces no output signal when the microwave system is in no rotary motion while it produces the output signal corresponding to the phase difference when the microwave system is in rotary motion. Since the direct current signal component of the output signal from the microwave detector 4 is indicative of the phase difference which is substantially proportional to the angular velocity of the microwave system, the indicator device 7' which receives the amplified direct current signal component of the output signal through the direct current amplifier 6' indicates the phase difference of the microwaves, or the angular velocity of the microwave system.

Figure 5:
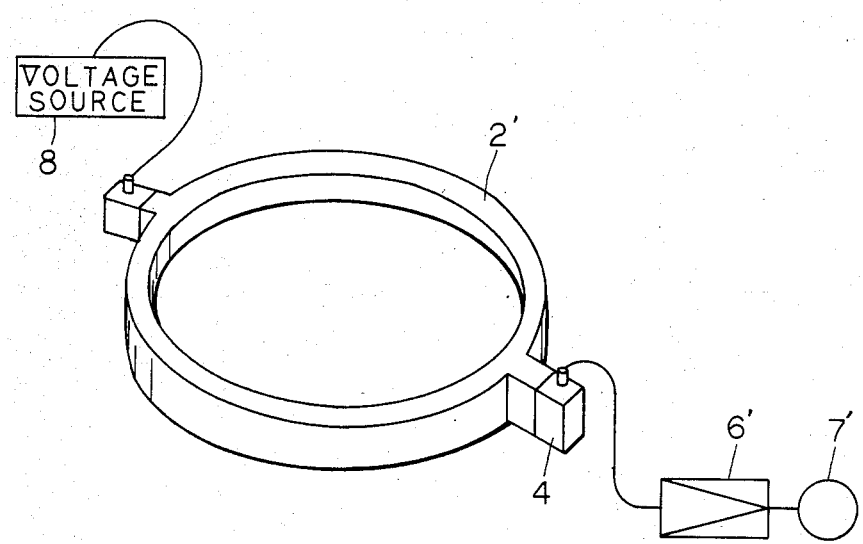
FIG. 5 is a schematic perspective view illustrating the angular velocity measuring apparatus according to the fourth embodiment of the invention.

The third embodiment of FIG. 4 may be modified as shown in FIG. 5 which illustrates the fourth embodiment of the invention. In this embodiment, the microwave oscillator 1 and the microwave detector 4 are connected with the waveguide 2' and preferably positioned diagonally to each other as in the second embodiment shown in FIG. 3.

The fourth embodiment operates in substantially the same manner as in the third embodiment except that each length of the microwave propagation paths through the waveguide 2 is reduced to one half as compared with that of the third embodiment. For this reason, the phase difference between the microwaves propagating clockwise and counterclockwise is also reduced to one half. However, the same indication of the angular velocity of the microwave system can be attained, if necessary, by the adjustment of the amplifier 6' or the indicator device 7'.

Figure 6:
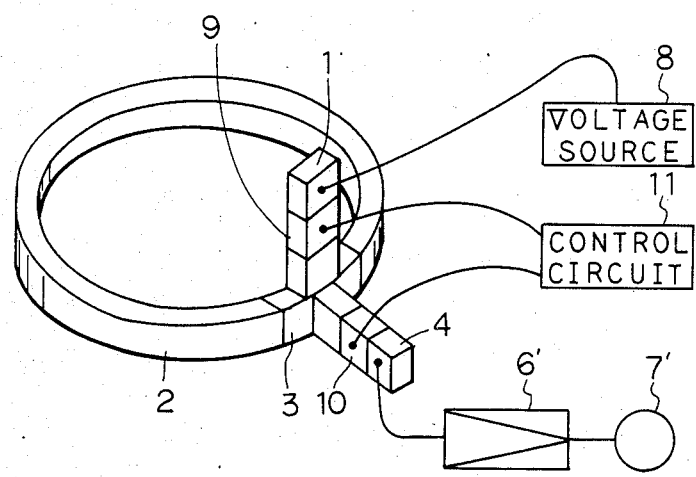
FIG. 6 is a schematic perspective view illustrating the angular velocity measuring apparatus according to the fifth embodiment of the invention.

Referring further to FIG. 6 which illustrates the fifth embodiment of the invention, a first high frequency switch 9 is securely connected between the microwave oscillator 1 and the input port of the magic tee 3 and a second high frequency switch 10 is securely connected between the output port of the magic tee 3 and the microwave detector 4. Each of the high frequency switches 9 and 10 may be a diode incorporated into a waveguide so that, when electric current supply to the diode is turned on and off, the microwave is cut off and passed therethrough, respectively. A control circuit 11 is connected to the diodes of the high frequency switches 9 and 10 to generate two control signals which are applied to the diodes, respectively.

Figure 7:
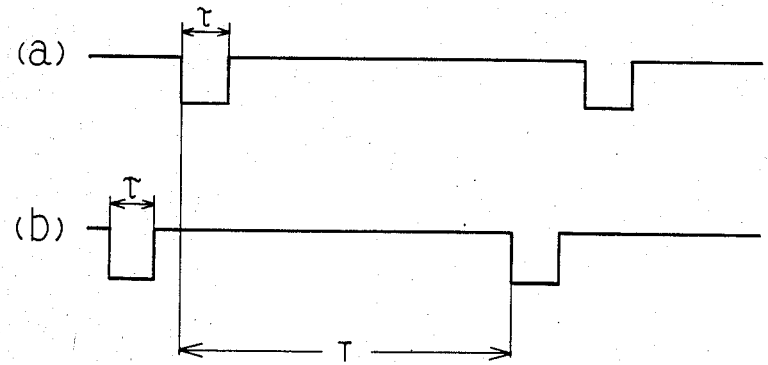
FIG. 7 is a waveform chart illustrating control signals (a) and (b) used in the fifth embodiment of the invention.

The control signals applied to the diodes of the first and second high frequency switches 9 and 10 are shown by (a) and (b) in FIG. 7, respectively. The control signals have high and low levels which respectively turn on and off the electric current supply to the diodes of the high frequency switches 9 and 10 so that the switches 9 and 10 close and open correspondingly. The time width τ is determined to be shorter than a time period in which the microwave completes one clockwise or counterclockwise propagation through the waveguide 2. In other words, the time width τ is determined to be shorter than the time period 2 πr/Vp. Further, the time width T which is a time difference between the openings of the high frequency switches 9 and 10 is determined to be a period 2 πrN/Vp in which the microwave completes N(integer) times of clockwise or counterclockwise propagation through the waveguide 2. Allowing the microwaves to propagate N times through the waveguide 2 results, in substance, in the propagation path lengthened by N times.

In operation, the microwaves generated by the microwave oscillator 1 pass through the first high frequency switch 9 only when the switch 9 is kept open during the time width τ by the low level control signal shown by (a) in FIG. 7 which turns off the electric current supply to the diode. The microwaves passed through the switch 9 are separated by the magic tee 3 equally and propagate clockwise and counterclockwise through the waveguide 2. Since the first high frequency switch 9 is closed by the high level control signal shown by (a) in FIG. 7 which turns on the electric current supply to the diode after lapse of the time width τ, that is, before the microwaves complete one propagation through the waveguide 2, and since the second high frequency switch 10 is kept closed at this moment by the high level control signal shown by (b) in FIG. 7, the microwaves keep propagating through the waveguide 2. After the microwaves complete N times of clockwise or counterclockwise propagation in the time period T, the second high frequency switch 10 is opened by the low level control signal shown by (b) in FIG. 7 which turns off the electric current supply to the diode during the time width τ. Thus, the microwaves which completed N times of propagations are turned by the magic tee 3 and transmitted to the microwave detector 4 through the switch 10 to be mixed and microwave-detected.

As described before, the microwaves propagating clockwise and counterclockwise through the waveguide 2 have no phase difference from each other if the microwave system is not in rotary motion, while they have phase difference from each other which is in substantial proportion to the angular velocity of the microwave system if the system is in rotary motion. Therefore, the phase difference or the angular velocity can be indicated by the indicator device 7' with the output signal of the microwave detector 4 applied through the direct current amplifier 6'.

It should be noted here that the phase difference between the microwaves propagating clockwise and counterclockwise becomes larger as the length of the microwave propagation path becomes longer. For this reason, the angular velocity of the microwave system can be measured more accurately in the fifth embodiment with the lengthened microwave propagation path.

Figure 8:
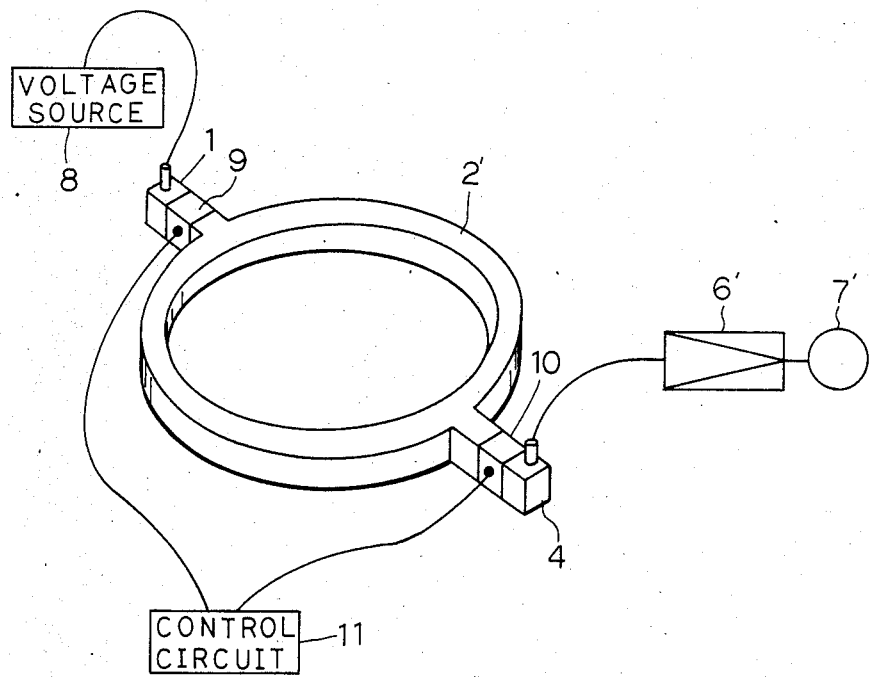
FIG. 8 is a schematic perspective view illustrating the angular velocity measuring apparatus according to the sixth embodiment of the invention.

The fifth embodiment may be also modified as shown in FIG. 8 which illustrates the sixth embodiment of the invention. In this embodiment, the first high frequency switch 9 is securely connected between the microwave oscillator 1 and the input port of the waveguide 2' and the second high frequency switch 10 is securely connected between the output port of the waveguide 2' and the microwave detector 4. The first and second switches 9 and 10 are controlled by the control signals of the control circuit 11 shown by (a) and (b) in FIG. 7, respectively. The time period T between the openings of the first and second switches 9 and 10 is determined to be a period in which the microwaves propagate N times and a half through the waveguide 2'.

The operation of the sixth embodiment is substantially the same as in the fifth embodiment except that the microwave generated by the microwave oscillator 1 propagates N times and a half through the waveguide 2' before mixed and microwave-detected by the microwave detector 4. Therefore no further description will be necessitated.

The fifth and sixth embodiments shown in FIGS. 6 and 8 may be modified to measure the angular velocity in accordance with the frequency difference.

Figure 9:
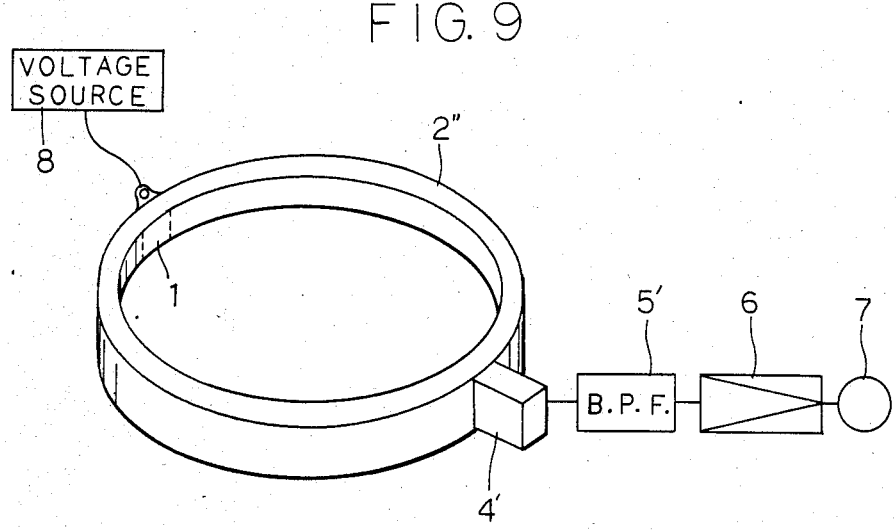
FIG. 9 is a schematic perspective view illustrating the angular velocity measuring apparatus according to the seventh embodiment of the invention.
Figure 10:
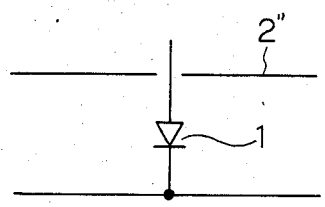
FIG. 10 is a schematic cross-sectional view illustrating a structural relation between the microwave oscillator and the waveguide used in the seventh embodiment.

Referring further to FIG. 9 which illustrates the seventh embodiment of the invention, the microwave oscillator 1 connected to the voltage source 8 is installed within a circularly closed waveguide 2". More specifically, the oscillator 1 which may be a Gunn diode or Impatt diode is securely installed as shown in FIG. 10 so that the microwaves are generated within the waveguide 2" in the clockwise and counterclockwise directions. A microwave detector 4' which will be described in detail later is securely connected with the waveguide 2" at a position diagonal to the microwave oscillator 1. A band pass filter 5' which passes only alternating current signal component in a predetermined low frequency range is connected to the wave detector 4'. The band pass filter 5' is further connected to the indicator device 7 through the low frequency amplifier 6.

Figure 11:
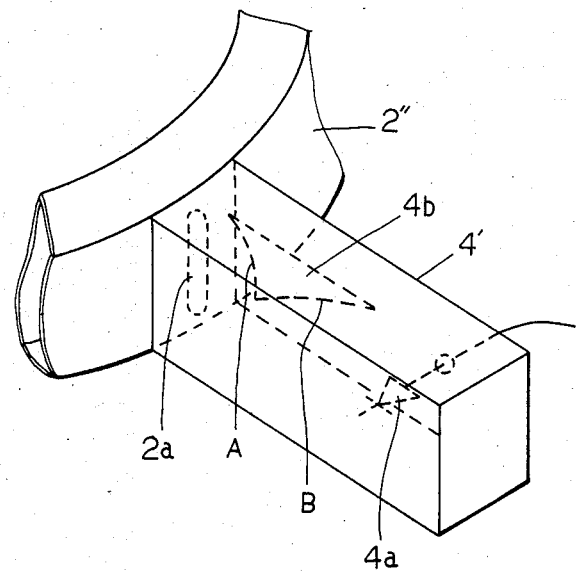
FIG. 11 is an enlarged schematic view illustrating a structural relation between the waveguide and the microwave detector used in the seventh embodiment.
Figure 12:
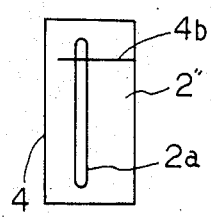
FIG. 12 is a schematic view illustrating a structural relation between the slit of the waveguide and the attenuator of the microwave detector used in the seventh embodiment.

As shown in FIG. 11, the waveguide 2" is provided, at the connecting portion with the microwave detector 4', with a slit 2a extending vertically the width of which is far shorter than the wavelength of the microwaves and the length of which is most preferably one half of the waveguide wavelength λg. The microwave detector 4' is provided therein with the microwave-detecting diode 4a and an attenuator 4b which attenuates the microwaves passing therethrough. The attenuator 4b may be a carbon paper, Bakelite or a glass vapor-deposited with metal. The attenuator 4b is shaped into a triangle two sides of which are in an exponential curve. As shown in FIG. 12, the attenuator 4b is attached horizontally at a position higher than the longitudinal center of the slit 2a.

Figure 13:
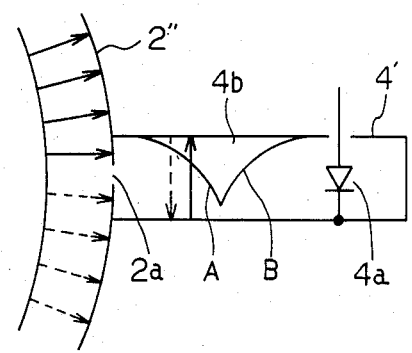
FIG. 13 is a schematic view illustrating the mode of microwave propagation in the waveguide and the microwave detector used in the seventh embodiment.

In operation, the microwave oscillator 1 generates the microwaves within the waveguide 2" in the clockwise and counterclockwise directions so that the microwaves propagate clockwise and counterclockwise through the waveguide 2". When the microwaves arrive at the slit 2a after completing respective propagation paths each length of which is one half of the whole circumferential length of the propagation path, a portion of microwaves are turned into the microwave detector 4' by the slit 2a to have opposite phases to each other as shown in FIG. 13 in which the microwaves propagated clockwise and counterclockwise are indicated by the solid and dotted arrows, respectively. The microwaves are then attenuated by the attenuator 4b and mixed and microwave-detected by the microwave-detecting diode 4a in the microwave detector 4'.

As described before, the frequencies $f_1$ and $f_2$ of the microwaves propagating clockwise and counterclockwise respectively are equal to each other under no rotary motion of the microwave system, while they are different from each other under rotary motion of the microwave system. The difference $\Delta f$ in frequencies $f_1$ and $f_2$ are detected by the microwave detector 4' or the diode 4a and the output signal having a frequency proportional to the angular velocity of the microwave system is produced therefrom. With this output signal applied to the indicator device 7 through the band pass filter 5' and the low frequency amplifier 6, the indicator device 7 comprising the frequency-to-voltage converter and voltmeter indicates the frequency difference $\Delta f$, or the angular velocity of the microwave system.

The seventh embodiment shown in FIGS. 9 through 13 may be modified to measure the angular velocity in accordance with the phase difference.

It should be noted in the seventh embodiment that, since the diode of the microwave oscillator 1 is incorporated within the waveguide 2", the frequencies $f_1$ and $f_2$ of the microwaves are determined only by the resonance circuits of the waveguide 2", the length of the microwave propagation paths, and hence more stabilized microwave oscillation is enabled than in the other embodiments in which the frequencies $f_1$ and $f_2$ of the microwaves are determined by the resonance circuits of the microwave oscillator 1 and the waveguide 2 or 2'. With more stabilized microwave oscillation, the detection and measurement of the angular velocity of the microwave system become more accurate. It should be noted further that, since the attenuator 4b such as carbon paper is provided between the slit 2a and the microwave-detecting diode 4a to prevent the reaction of the diode 4a from influencing on the microwave oscillation within the waveguide 2", that is, to separate the microwave oscillation from the microwave-detection, still more stabilized microwave oscillation is enabled to have an accurate detection and measurement of the angular velocity. It should be still further noted that, since the band pass filter 5' which cuts off noise signals having frequencies outside the predetermined frequency range is employed, more accurate detection and measurement of the angular velocity are enabled.

The present invention described above with respect to the first to seventh embodiments should not be limited thereto but may be modified in many ways some of which will be described hereinunder.

Figure 14:
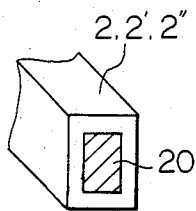
FIG. 14 is a schematic cross-sectional view illustrating a modification of the waveguide used in the first to seventh embodiment.

The waveguide 2, 2' and 2" which have respective hollow microwave propagation paths may be filled, as shown in FIG. 14, with dielectric materials 20 having a high dielectric constant and low dielectric loss so that more accurate measurement can be performed. The material may be selected from ceramics such as $TiO_2$, $BaO\text{-}TiO_2$, $Sr(Li1\frac{1}{4}, Nb3\frac{3}{4})O_3\text{-}SrTiO_3$, $PbTiO_3\text{-}PbZrO_3$, $MgTiO_3$, $CaTiO_3$ and the like or from resins such as vinyl chloride, polyethylene, epoxy, nylon and the like.

Figure 16:
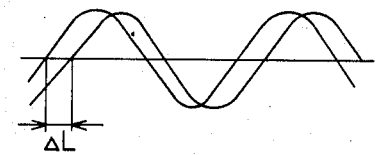
FIG. 16 is a waveform chart illustrating two phase differences (a) and (b) provided when the microwave propagation path of the waveguide is filled with a dielectric material and is hollow, respectively.
Figure 16:
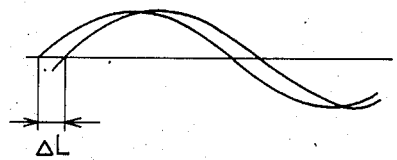

In general the waveguide wavelength $\lambda g$ is varied with the medium in the microwave propagation path and, more specifically, it is reduced to $1/\sqrt{\epsilon}$ times with the dielectric material having the dielectric constant $\epsilon$, while the frequency $f$ of the microwave which is in inverse proportion to the waveguide wavelength is increased by $\sqrt{\epsilon}$ times. Therefore, in the embodiments in which the measurement of the angular velocity is performed in accordance with the frequency difference $\Delta f$, the frequency difference $\Delta f$ is increased by $\sqrt{\epsilon}$ times and hence highly accurate measurement is enabled. On the other hand, as shown in FIG. 16 in which waveforms (a) and (b) have shorter and longer wavelengths respectively, the phase difference $\Delta L$ becomes longer as the waveguide wavelength becomes shorter. Therefore, in the embodiments in which the measurement of the angular velocity is performed in accordance with the phase difference $\Delta L$, the phase difference $\Delta L$ is increased by the use of dielectric material and hence highly accurate measurement is enabled.

Figure 15:
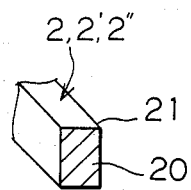
FIG. 15 is a schematic cross-sectional view illustrating a modification of the waveguide used in the first to seventh embodiment.

The waveguide 2, 2' and 2" may, as shown in FIG. 15, be formed by the solid dielectric material 20 shaped into constant configuration and a thin metal film 21 metallized thereover. The metal for the thin film can be gold, silver, aluminum or the like which has a good electric conductivity and can be metallized by the nonelectro-plating, chemical vapor deposition, physical vapor deposition and the like. Thus, the dimensional precision of the dielectric material 20 is enhanced, and the disturbance of radio wave at the surface between the dielectric material 20 and the thin metal film 21 is minimized since there exists no space therebetween.

The waveguide 2, 2' and 2" need not be in a circularly closed type but may be in a rectangularly closed type.

A coaxial cable may be used instead of the waveguide 2, 2' and 2".

What I claim is:

1. An apparatus for measuring angular velocity comprising:
    a single, microwave producing oscillation diode for generating microwaves;
    propagation means, secured to said oscillation diode and having a closed-loop microwave propagation path, for dividing said microwaves from said oscillation diode into first and second portions and propagating said first portion of said microwaves clockwise through said propagation means and propagating said second portion of said microwaves counterclockwise through said propagation means;
    a single, microwave detection diode secured to said propagation means for receiving said first and second portions of said microwaves from said propagation means so as to interact and mix therein, and microwave-detecting the frequency difference between said received first and second portions of said microwaves for providing a single electric output signal including an alternating current signal component varying with the angular velocity of said propagation means; and
    means for determining angular velocity from said output signal, including circuit means for determining the angular velocity of said propagation means in response to the frequency of said alternating current signal component of said output signal produced by said detection means.

2. An apparatus according to claim 1, wherein said attenuator comprises:
    a carbon paper formed into a triangular shape and provided horizontally at a point higher than a longitudinal center of said slit.

3. An apparatus according to claim 1, wherein said microwave propagation path of said propagation means is filled with a dielectric material having a high dielectric constant.

4. An apparatus according to claim 1, wherein said propagation means comprises:
    a closed-loop solid dielectric material having a high dielectric constant and a low dielectric loss and forming said microwave propagation path; and
    a thin conductive metal film provided over said solid dielectric material.

5. An apparatus according to claim 1, wherein said propagation means comprises:
    a coaxial cable formed in a closed-loop.

6. An apparatus for measuring angular velocity comprising:
    a single, microwave producing oscillation diode, for generating microwaves;
    propagation means having a closed-loop microwave propagation path for separating and propagating the microwaves generated by said microwave oscillator means clockwise and counterclockwise therethrough, and having an output portion to output said microwaves propagating clockwise and counterclockwise;
    a single, microwave detecting diode secured to said output portion, for receiving said microwaves propagating clockwise and counterclockwise in said propagation means, so as to interact and mix therein and for microwave-detecting said received clockwise and counterclockwise microwaves to produce an electric signal including a signal component corresponding to the difference in frequencies between said microwaves propagating clockwise and counterclockwise; and
    low frequency amplifier means for low frequency-amplifying said electric signal from said microwave-detecting diode and producing an alternating current signal having a frequency proportional to the angular velocity of said propagation means.

7. An apparatus according to claim 6, wherein said propagation means comprises:
    a waveguide, said oscillation diode being disposed therein.

8. An apparatus according to claim 6, wherein said propagation means comprises:

a waveguide provided with a slit at a position where said detecting diode is secured thereto in order to transmit said microwaves propagated clockwise and counterclockwise therethrough to said detecting diode.

9. An apparatus according to claim 6, further comprising:

a filter provided between said microwave-detecting diode and said low frequency amplifier means for passing only desired low frequency components of said electric signal.

10. An apparatus for measuring angular velocity comprising:

a single, microwave producing oscillation diode for generating microwaves;

propagation means, including a loop waveguide defining a slit at a position displaced from said microwave producing diode, said propagation means having a closed-loop microwave propagation path, for dividing microwaves from said oscillation diode into first and second portions and propagating said first portion clockwise through said propagation means and propagating said second portion counterclockwise therethrough;

a single, detecting diode for receiving from said propagation means said first and second portions so as to interact and mix therein and provide an electric output signal including an alternating current signal component varying with the angular velocity of said propagation means;

an attenuator provided between said slit of said waveguide and said diode for attenuating said microwaves microwave-detected by said detecting diode;

means for determining angular velocity from said output signal said determining means including circuit means for determining the angular velocity of said propagation means in response to the frequency of said alternating current signal component.

11. An apparatus according to claim 10, wherein said attenuator comprises:

a carbon paper formed into a triangular shape and provided horizontally at a point higher than a longitudinal center of said slit.

* * * * *